(12) United States Patent
Partanen et al.

(10) Patent No.: US 7,772,302 B2
(45) Date of Patent: Aug. 10, 2010

(54) INCORPORATION OF PLASTIC SCRAP IN ASPHALT COMPOSITIONS

(75) Inventors: John Eric Partanen, Colton, CA (US); Stanley W. Ellis, Bakersfield, CA (US); David Bartell, Bakersfield, CA (US)

(73) Assignee: Sierra Process Systems, Inc., Bakersfield, CA (US)

( * ) Notice: Subject to any disclaimer, the term of this patent is extended or adjusted under 35 U.S.C. 154(b) by 86 days.

(21) Appl. No.: 12/177,692

(22) Filed: Jul. 22, 2008

(65) Prior Publication Data

US 2010/0022686 A1    Jan. 28, 2010

(51) Int. Cl.
*C08K 95/00*    (2006.01)
(52) U.S. Cl. .................... 524/59; 106/284.01
(58) Field of Classification Search ............ 106/284.01; 524/59
See application file for complete search history.

(56) References Cited

U.S. PATENT DOCUMENTS

| 3,853,800 | A | * | 12/1974 | Haberl | 523/330 |
|---|---|---|---|---|---|
| 4,000,095 | A | * | 12/1976 | Van Den Berg | 521/40 |
| 6,000,877 | A | * | 12/1999 | Fishback et al. | 404/17 |
| 2005/0089371 | A1 | * | 4/2005 | Gallant | 404/72 |
| 2006/0226247 | A1 | * | 10/2006 | Abramson et al. | 238/1 |
| 2009/0084287 | A1 | * | 4/2009 | Partanen et al. | 106/273.1 |

* cited by examiner

*Primary Examiner*—Peter Szekely
(74) *Attorney, Agent, or Firm*—Townsend and Townsend and Crew LLP.; M. Henry Heines

(57) ABSTRACT

Scrap plastic is treated for incorporation into asphalt-aggregate compositions by first shredding the plastic, then heating the shredded plastic to harden any pieces of film or flexible plastic and to generally reduce the size of the shreds without decomposing the plastic, and then grinding the heat-treated pieces to a size that can be blended with an aggregate. The blend is then combined with an asphalt binder to produce an asphalt-aggregate composition. No discrimination among, or selection of, specific types or classes of plastic is required.

27 Claims, No Drawings

INCORPORATION OF PLASTIC SCRAP IN ASPHALT COMPOSITIONS

BACKGROUND OF THE INVENTION

1. Field of the Invention

This invention resides in asphalt technology and asphalt formulations, and also in waste management, particularly in connection with the disposal of scrap plastic.

2. Description of the Prior Art

Plastics are used in nearly every facet of modern life throughout the world. Food is wrapped in or protected by plastics; tools purchased at the local hardware store or warehouse store are encased in plastic; computers include numerous plastic components and structural features; plastic bags are used for handling trash; and even clothes contain significant amounts of plastics. The need for recycling plastics is great and continues to increase as the public becomes more conscious about environmental concerns and the depletion of natural resources.

There are many different types and varieties of plastics, and all are recyclable. A classification system has been established by the Society of Plastics Industry (SPI), as follows:

Class 1: Polyethylene terephthalate (PET) and polyethylene terephthalate ester (PETE), more commonly known as "polyester." PETE fibers are made under the tradenames of DACRON® (E.I. duPont de Nemours & Co., Wilmington, Del., USA) and FORTREL® (Wellman, Inc., Fort Mill, S.C., USA). PETE film is known commonly as MYLAR® (E.I. duPont de Nemours & Co., Wilmington, Del., USA). Many food items are packaged in PETE and most of the transparent and colored 2-liter beverage bottles sold in grocery stores are made from PETE, with the exception of opaque bases which are typically made from High Density Polyethylene (HDPE).

Class 2: High density polyethylene (HDPE). HDPE is used for plastic milk bottles, water bottles, cosmetics containers, most plastic grocery bags, and trash bags.

Class 3: Polyvinyl chloride (PVC). Most of the PVC that is produced is used in the manufacture of plastic pipe and conduit. PVC is also used to produce vinyl siding, and vinyl window and door frames. PVC is also used to encase many items such as tools and toys, and is still used to produce plastic bottles. PVC may be made pliable with the addition of phthalate ester and then used to make raincoats, shower curtains, and rubber boots.

Class 4: Low density polyethylene (LDPE). LDPE is used in the manufacture of light weight plastic films, and for food and sandwich bags.

Class 5: Polypropylene (PP). Most PP is used in the production of auto and truck interiors such as door and instrument panels, although some is used in the food packaging. Another important use is in fibers for clothing and carpets.

Class 6: Polystyrene (PS). Polystyrene is used to produce styrofoam, which is used in packing, insulation, and food wraps. PS is also used for food containers that are clear, thin, and rigid such containers for salads and bakery goods. Many household items, including broom handles, television cases, computer cases, and dry cosmetic containers, are produced from PS.

Class 7 covers any plastics that do not fall in any of Classes 1 through 6. These include polytetrafluoroethylene (PTFE), polyurethane (PU), polycarbonates (PC), polyamides (PA) such as nylon, and the polyacrylamides and polymethacrylamides (PMA) used as an absorbent in diapers and potting soils.

The recycling of plastics generally requires that the sorting of plastic items by their classification, which is tedious and expensive. While many municipalities do sort discarded plastics, the plastics that are actually recycled are typically restricted to those of Class 1 (primarily PETE) and Class 2 (primarily HDPE). Class 3 (PVC), Class 4 (LDPE), Class 5 (PP), Class 6 (PS), and Class 7 (other) plastics are separated from the Class 1 and 2 plastics and sent for disposal in landfills. The need to recycle or reuse all of the various types of plastics in an inexpensive way, and to benefit from the reuse of the recycled plastics, thus remains.

Two general strategies for utilizing recycled plastic in asphalt have been disclosed in the prior art.

The first strategy is to incorporate the plastics into an asphalt binder or mastic. This approach finds its origin in the work of Charles H. McDonald which involved the incorporation of automotive tire rubber into asphalt. Patents disclosing this process are McDonald, C. H., U.S. Pat. No. 3,891,585 ("Elastomeric pavement repair composition for pavement failure and a method of making the same," Jun. 24, 1975); Winters R. E., et al., U.S. Pat. No. 3,919,148 ("Pavement composition," Nov. 11, 1975); McDonald, C. H., U.S. Pat. No. 4,018,730 ("Method for emulsifying asphalt-rubber paving material and a stable thixotropic emulsion of said material, Apr. 19, 1977); Nielsen, D. L., et al., U.S. Pat. No. 4,068,023 ("Rubberized asphalt paving composition and use thereof," Jan. 10, 1978); and Woo, H. W., et al., U.S. Pat. No. 4,085,078 ("Method and apparatus for increasing contrast and resolution from low density film," Jul. 12, 1977).

The concept was extended to recycled plastics by Haberl, P., in U.S. Pat. No. 3,853,800 ("Process For Preparing a Mixture Containing a Binder Material and Polyolefin," Dec. 10, 1974), who used a high-molecular-weight polyolefin dispersed in a liquid polyolefin of low molecular weight. Other processes using polyolefins were disclosed by Hemersam, R., in U.S. Pat. No. 4,240,946 ("Method of preparing a bituminous binder and a construction material containing the same," Dec. 23, 1980); Biegenzein, G., in U.S. Pat. No. 4,314,921 ("Method and apparatus for preparing a bituminous binder," Feb. 9, 1982); Strommer, E., U.S. Pat. No. 4,988,747 ("Process for preparing a bituminous binder modified with plastics for building materials," Jan. 29, 1991); and Strommer, E., U.S. Pat. No. 5,137,946 ("Process for preparing a bituminous binder modified with plastic for building materials," Aug. 11, 1992). The specific use of low-density polyethylene is disclosed by Moran, L. E., in U.S. Pat. No. 4,868,233 ("Polyethylene modified asphalts," Sep. 19, 1989). The use of oxygen-modified polyethylene is disclosed by Ho, K., et al., in U.S. Pat. No. 5,302,638 ("Asphalt/O-modified polyethylene," Apr. 12, 1994). The use of scrap carpet backing containing polypropylene, styrene butadiene rubber, and calcium carbonate is disclosed by Kwok, W. L., et al., in U.S. Pat. No. 6,214,908 ("Composition containing novel modifier," Apr. 10, 2001). Further use of polypropylene and polyethylene is disclosed by Forgac, J. M., et al., in U.S. Pat. No. 6,844,418 ("Waste plastic additive for asphalt," Jan. 18, 2005). The plastics used in the patents listed in this paragraph are limited to those of Class 2, Class, 4 and Class 5, and the processes require separation of the plastics of these classes from those of other classes, which is expensive and tedious.

The second strategy is to use the plastic to supplement the mineral aggregate in hot mix asphalt paving compositions. Disclosures of this strategy appear in Brown, H. J., U.S. Pat. No. 3,852,046 ("Method for recycling waste plastics and products thereof," Dec. 3, 1974); Baker, C., U.S. Pat. No. 4,018,722 ("Reclaimed plastic material," Apr. 19, 1977); van den Berg, A. J., U.S. Pat. No. 4,028,293 ("Method for preparing materials containing minerals and synthetic substances, materials manufactured according to said method and objects consisting of said materials," Jun. 7, 1977); Fishback, G. M., et al., U.S. Pat. No. 5,702,199 ("Plastic asphalt paving material and method of making same," Dec. 30, 1997); and Berto, D., U.S. Pat. No. 6,030,572 ("Method for making a plastic aggregate," Feb. 29, 2000). None of these patents, however, address processes that are applicable to scrap and recyclable plastic films that contain Class 2, Class 4, and Class 6 plastics, i.e., those that contain HDPE, LDPE, PP, and/or PS, which constitute a major portion of scrap municipal waste plastics. While these films can be shredded, the shreds cannot be successfully added to the hot mix paving compositions since they tend to clump and wind around the blades of the pugmills in batch plants and adhere to the mixing flights inside continuous drum mixer hot plants.

Adobe bricks are typically made from sand, clay, water, and fibrous material such as sticks, straw, or dung, forming a mixture that is shaped in frames into bricks and then dried in the sun for a period of time ranging from a few days to weeks. ASTM specifications for adobe bricks require that the soil meet certain particle size distributions, contain certain quantities of silt and clay, and have a plasticity index between 2 and 15 and an unconfined compressive strength of at least 300 pounds per square inch. The specifications further require that the brocks absorb no more than 2.5% by weight of water when only one side of the brick, with a water-proof coating applied, is exposed to water for seven days. Asphalt emulsions, pine tar, and tall oil pitch emulsions have been used in place of the water to achieve bricks with slightly higher unconfined compressive strengths and greater water resistance.

SUMMARY OF THE INVENTION

It has now been discovered that scrap plastic can be treated for incorporation into an asphalt-aggregate composition without the need to sort the plastic to remove select certain classes and discard the remainder, and with certain benefits to the composition, including increasing the durability of the composition, lowering the tendency of the binder to separate from the aggregate during processing, and lowering the incidence of failure of the finished asphalt. In accordance with this invention, the scrap plastic is first shredded, then heated to harden the plastic and reduce the sizes of the shreds, then cooled and ground or otherwise mechanically reduced in size to a size comparable to that of the solid granulated aggregate. Following this last size reduction, the treated plastic particles are added to the aggregate, preferably at an elevated temperature, and the plastic-aggregate blend is then combined with an asphalt binder for incorporation into an asphalt-aggregate composition. The aggregate can be either conventional aggregate used in asphalt pavements and roofing materials or soil such as adobe soil to make adobe bricks. The invention is thus a combination of thermal treatment of the scrap plastic beyond mere cleaning or drying, and mechanical size reduction, and incorporation of the thermally treated and size-reduced plastic into the asphalt-aggregate composition in solid form as part of the aggregate. Additional processing steps are included in certain embodiments of the invention.

These and other objects, features, and advantages of the invention will be more apparent from the descriptions that follow.

DETAILED DESCRIPTION OF THE INVENTION AND PREFERRED EMBODIMENTS

This invention can make use of scrap plastic of all seven classes, including the simultaneous use of two or more classes of plastic. To benefit most from the heat treatment and any cleaning and disinfection steps that may also be performed, the scrap plastic is first shredded. Shredding is accomplished by conventional shredding equipment, after or in conjunction with separating the plastic from non-plastic materials such as metals, glass, and paper or cardboard. The degree of shredding is not critical and can vary depending on the type and form of the plastic and on the needs of the asphalt formulating system in which the treated plastic will be used. Scrap plastic in the form of plastic bags and other plastic films for example can be shredded down to shards or strips that are about 6 inches (12.54 cm) in length and about one-half inch (1.27 cm) in width. Plastic jars, bottles, jugs, and foams can be shredded to shards about 2 inches (5.08 cm) in length and about one inch (2.54 cm) in width. The ranges of optimal dimensions of shards obtained from scrap of any particular shape, composition, or source are readily determinable by routine trial and error.

As an optional step prior to any further processing, the shards or strips can be decontaminated to remove bacteria and microorganisms in general as well as dirt, food, and chemical deposits. This decontamination is readily accomplished by conventional means, such as for example by washing with hot water or any aqueous liquid. A wash temperature exceeding 75° C. (167° F.) will generally suffice, although a temperature of from about 90° C. (194° F.) to about 100° C. (212° F.) is preferred. A particularly preferred treatment is a water wash at 98° C. (208.4° F.).

With or without decontamination, the shards are next shrunken by exposure to heat. The heating temperature will depend on the heating time and vice versa, and the degree of exposure will be less than that which will cause combustion or release of gaseous decomposition products from the plastic material, but sufficient to harden any soft or flexible plastic shards into a form that can be ground, such as beads or pellets, and to generally cause the pieces to shrink in size. While the heating conditions that achieve these results are readily determinable by routine experimentation, a temperature within the range of about 110° C. (230° F.) to about 250° C. (482° F.) and an exposure time of from about one minute to about thirty minutes will generally suffice. A preferred temperature range is from about 135° C. (275° F.) to about 232° C. (450° F.) and a preferred exposure time is from about one minute to about ten minutes. Exposure at 135° C. (275° F.) for about five to ten minutes, or at 232° C. (450° F.) for one to three minutes, for example, will generally be sufficient. The heating can be performed in any atmosphere, including air, both static and forced.

Once the heat treatment is complete, the plastic pieces are cooled to a temperature suitable for further processing. Temperatures below 50° C. (122° F.), and preferably temperatures below 38° C. (100° F.), will generally be appropriate. The cooled pieces are then granulated by grinding or any conventional size reduction equipment suitable for solid plastic, to particles that are about 15 mm or less in diameter, and preferably smaller. Preferred size reduction will result in particles small enough to pass through a screen with 12.5-mm (½-inch) openings and most preferably a screen with 4.75-mm openings (No. 4 mesh, United States Standard Sieve Size).

The heat-treated, granulated plastic is then combined with aggregate and asphalt binder to form an asphalt-aggregate composition that can be used for paving, roofing, and any other uses that asphalt is known for. Preferred asphalt compositions are those used as "warm mix" and "hot mix" asphalts as these terms are known in the art. Additives known in the art can be included as well, for purposes of modifying or improving the properties of the asphalt. Preferably, the aggregate is first heated to the processing temperature, or a temperature within the range of from about 150° C. (302° F.) to about 250° C. (482° F.) and the granulated plastic is blended with the heated aggregate just before the asphalt is added. The proportion of granulated plastic relative to the entire asphalt-aggregate composition can vary and is not critical to this invention provided that the final composition adequately serves the functions of asphalt compositions for the intended uses of the composition. In most cases, best results will be achieved with from about 0.2% to about 20% by weight, and preferably from about 0.3% % to about 10% by weight, of granulated plastic relative to the entire composition.

The terms "aggregate" and "solid granulated aggregate" are used herein to denote any hard, inert, and typically mineral material that is bound together by the asphalt binder and included for adding strength, decorative effect, or both. Examples of aggregate that is used in asphalt paving and roofing materials are marble, limestone, basalt, dolomite, sandstone, granite, and quartzite. Recycled asphalt pavement (RAP) and material such as Portland cement pavement are also used as aggregate. Any of various known grades of aggregate can be used in the practice of this invention. These include dense graded, uniform graded, gap graded, and open graded aggregates, as well as stone mastic asphalt aggregate. As noted above, the terms "aggregate" and "solid granulated aggregate" are also defined to include adobe soil, useful in the practice of the invention for the manufacture of adobe bricks. Typical adobe soil is primarily clay or a combination of sand and clay. To prepare the soil for use in manufacturing adobe bricks, the soil is dried, and rocks, vegetation, and other unwanted materials are then removed, and the soil is crushed. A typical soil particle size for use in the present invention is minus-30 mesh (0.6 mm of less). Whether paving-type aggregate or adobe aggregate is used, the aggregate in preferred implementations of the invention constitutes from about 70% to about 97%, most preferably from about 75% to about 95%, of the composition, independently of the heat-treated and granulated plastic.

The term "asphalt-aggregate composition" is used herein to denote a combination that includes aggregate and asphalt binder in addition to the heat-treated, granulated plastic. The asphalt binder in these compositions can be any of a variety of known asphalt binders, including native asphalts, rock asphalts, and petroleum asphalts, as well as asphalts that have been modified, blended, or both. Petroleum-derived asphalts are preferred. The asphalt can be liquefied by heating to a temperature above its softening temperature. The asphalt can also be liquefied by blending with a petroleum distillate fraction such as gas oil, kerosene, naphtha, or any other petroleum-derived oil that is liquid at ambient temperature, to achieve a composition known as a cutback asphalt. The asphalt can also be liquefied by dispersing in water to form an emulsion. The suspension can thus be designed for use in preparing either hot mix asphalts, cold mix asphalts, or warm mix asphalts. Asphalts that are not diluted with diluents are used in preparing hot mix and warm mix asphalts, while asphalts that are diluted with hydrocarbons or water to render the asphalt flowable at ambient temperature, commonly referred to as cutback asphalts and asphalt emulsions, are used in preparing cold mix asphalts. Asphalts for use as warm mix asphalts typically require heating to temperatures up to about 150° C. (302° F.) or above to be in flowable liquid form, while asphalts for use as hot mix asphalts typically require heating to temperatures up to about 200° C. (392° F.) or above.

Examples of asphalt binders suitable for use in this invention are penetration graded asphalts such as those known in the industry as 30-40 pen, 40-50 pen, 50-60 pen, 85-100 pen, and 120-150 pen; asphalt cements such as those known in the industry as AC-5, AC-10, AC-20, AC-30, and AC-40; aged residue asphalts such as those known in the industry as AR-1000, AR-2000, AR-4000, AR-8000, and AR-16,000; and performance graded asphalts such as those known in the industry as PG 58-28, PG 64-22, PG 70-16, PG 70-10, PG 70-22, and PG 76-22, including blends of polymer asphalts and tire rubbers such as PG 70-22 TR, PG 70-28 TR, PG 76-16 TR, and PG 76-22 TR (alternatively designated as PGTR 70-22, etc.).

A further additive that is included in certain asphalt-aggregate compositions in accordance with this invention is dehydrated waste solids from crude oil refining operations, preferably comminuted to a fine particle size. The waste solids are typically derived from refinery sludges. Examples are API separator sludges, sludges from dissolved-air and induced-air flotation systems, slop oil emulsion sludges, tank bottoms, sludges resulting from cleaning heat exchange bundles, crude oil storage tank sediments, clarified slurry oil tank sediments, sludges from in-line filters, and sludges from drainage ditches. The solids can be concentrated or extracted from the sludges by centrifuges, filter presses, belt presses, vacuum filters, or other mechanical dewatering devices, and the solids can be further dehydrated by thermal desorption. Thermal desorption can be performed in heated rotary dryers or thermal screws, and is typically performed at a temperature of from about 93° C. (200° F.) to about 480° C. (900° F.). Size reduction is then performed by conventional crushers or mills, to a size within the range of about 600 microns or less, and preferably 250 microns or less.

As indicated by the above descriptions of asphalt binders, asphalt compositions in accordance with this invention can be supplemented by the inclusion of rubbers and other polymers to modify and improve the physical and mechanical performance of the final material, and particularly for increasing stress resistance. Examples of these rubbers and other polymers are butyl rubbers, polybutadiene, polyisoprene, polyisobutene, ethylene/vinyl acetate copolymer, polyacrylate, polymethacrylate, polychloroprene, polynorbornene, ethylene/propylene/diene (EPDM) terpolymer, styrene butadiene styrene co-block polymers, styrene isoprene styrene co-block polymers, styrene butadiene polymers, random or block copolymers of styrene and a conjugated diene, ethylene vinyl acetate polymers, low-density ethylene polymers, vinyl acrylic polymers, and low-density acrylic polymers. Recycled tire rubber is widely used and particularly convenient as a polymeric additive. A polymer thickener can also be included. When included, the polymer preferably constitutes from about 0.5% to about 15% by weight of the final composition. When virgin rubbers are present, sulfur can also be included as an additive to vulcanize the virgin rubber.

The incorporation of heat-treated, granulated plastics into asphalt compositions in accordance with this invention can be performed in conventional warm mix or hot mix plants, including batch plants and drum mix drier plants. These plants include a rotary drum into which the aggregate is heated by a burner fueled by natural gas or diesel. In a batch-type plant, the heated aggregate is typically placed in a large pugmill together with the heat-treated, granulated plastic and any additives, and the entire combination is milled until a uniform mixture is achieved. In drum mix drier plants, the asphalt binder and additives can be introduced directly into the rotating drum itself, so that mixing will occur in the drum. Once the mixture is uniform, it can be conveyed to heated storage silos for loading into transport trucks, or directly into transport trucks, particularly when the mixtures are prepared in batch-type plants.

Of the following examples, those illustrating the invention describe asphalt and adobe compositions in which the recycled plastic is referred to by the acronym MHTGP for "mixed, heat-treated, granulated plastic." The scrap plastic prior to the shredding, heat treatment, and granulation consisted of plastic articles separated from common municipal waste, and included such articles as plastic bags, plastic food containers and lids, plastic cups, and in general both filmed and foamed plastic. The distribution of the plastic among the Classes listed above was about 1-15% Class 1 plastic, 1-15% Class 2 plastic, 0-5% Class 3 plastic, 1-5% Class 4 plastic, 1-5% Class 5 plastic, 1-15% Class 6 plastic, and 0-5% Class 7 plastic, all by weight. The plastic was first shredded to shards of approximately 6 inches (15.2 cm) in length and 0.5 inch (1.25 cm) in width. The shards were then washed in hot water at 98° C. (208.4° F.) to remove contaminants and kill bacteria. The washed shards were then heated to 232° C. (450° F.) for three minutes, causing the shards to shrink in size to approximately 0.8 inch (0.2 cm)×1.2 inch (3 cm) or less. The shrunken pieces were then cooled to below 38° C. (100° F.), and ground to a size that passed either a 12.6-mm screen or a 4.75-mm screen, as indicated below.

Three types of aggregate were used—known in the asphalt art as "dense graded aggregate," "open graded aggregate," and "stone mastic asphalt aggregate," respectively. The particle size range in both the dense and open graded aggregate is from about 0.75 mm (0.03 inch) to about 12.5 mm (0.5 inch), and "dense graded aggregate" has a size gradation that is at or near maximum density (sizes approaching even distribution throughout the range) while "open graded aggregate" has a size range concentrated above 5 mm, with only a small proportion of particles at the lower end of the range. The particles of stone mastic asphalt aggregate are generally coarse. Petroleum refinery waste solids, used in some of the examples, were prepared from a slurry of centrifuge waste solids that had been dehydrated to a moisture content of less than 0.5% by heating. These solids are denoted by the acronym "TDRS" for "thermally dehydrated refinery solids." Both "warm mix" and "hot mix" asphalts were prepared, the warm mix at up to 155°7C. (311° F.) and the hot mix at up to 204° C. (400° F.), as indicated. The products were characterized by test procedures that are standard in the asphalt industry, including tensile strengths both dry and water-soaked, and retained tensile strengths according to the modified Lottman test ("Resistance of Compacted Bituminous Mixture to Moisture Induced Damage," Test Method T 283-85, AASHTO, Part II—Methods of Sampling and Testing, August, 1986). The retained tensile strength percentage is the ratio of the water-soaked value to the dry value multiplied by 100. Marshall stability and flow measurements were made by placing the product in a 4-inch (10.2-cm) Marshall mold in three layers, and subjecting each layer to 25 blows with a Marshall hammer on one side only.

All proportions and percentages in the examples are by weight unless otherwise indicated.

Examples Illustrating the Invention

Warm Mix Asphalt Paving Compositions with Dense Graded Aggregate and 0.3-0.6% ½-Inch MHTGP Example 1

A mixture was prepared by combining the following components at 155° C. (311° F.) in the proportions indicated: 93.65%/2-inch dense graded aggregate, 0.35% ½-inch MHTGP, 2.00% TDRS, 4.00% PG 64-22 petroleum asphalt. The combination was mixed by hand in a bowl per AASHTO Test Method T-245-94 for 45 seconds at 155°7C. (311° F.). The properties of the product were then determined with the following results:

| Bulk Specific Gravity | 2.1341 |
|---|---|
| Marshall Stability | 972 pounds |
| Marshall Flow | 0.117 inch |

Example 2

A mixture was prepared by combining the following components at 155° C. (311° F.) in the proportions indicated: 92.07% ½-inch dense graded aggregate, 0.43% 12-inch MHTGP, 2.50% TDRS, 5.00% PG 64-22 petroleum asphalt, using the same procedure and conditions as those of Example 1. The properties of the product were then determined with the following results:

| Bulk Specific Gravity | 2.1898 |
|---|---|
| Marshall Stability | 1140 pounds |
| Marshall Flow | 0.131 inch |

Example 3

A mixture was prepared by combining the following components at 155° C. (311° F.) in the proportions indicated: 91.26% ½-inch dense graded aggregate, 0.48% ½-inch MHTGP, 2.76% TDRS, 5.50% PG 64-22 petroleum asphalt, using the same procedure and conditions as those of Example 1, except that only 35 seconds of mixing was required to achieve coating of the aggregate with the asphalt. The properties of the product were then determined with the following results:

| Bulk Specific Gravity | 2.2431 |
|---|---|
| Marshall Stability | 1407 pounds |
| Marshall Flow | 0.154 inch |

Example 4

A mixture was prepared by combining the following components at 155° C. (311° F.) in the proportions indicated: 90.48% ½-inch dense graded aggregate, 0.52% ½-inch MHTGP, 3.00% TDRS, 6.00% PG 64-22 petroleum asphalt, using the same procedure and conditions as those of Example 1, except that only 35 seconds of mixing was required to achieve coating of the aggregate with the asphalt. The properties of the product were then determined with the following results:

| | |
|---|---|
| Bulk Specific Gravity | 2.2378 |
| Marshall Stability | 1768 pounds |
| Marshall Flow | 0.171 inch |

Example 5

A mixture was prepared by combining the following components at 155° C. (311° F.) in the proportions indicated: 89.68% ½-inch dense graded aggregate, 0.57% ½-inch MHTGP, 3.25% TDRS, 6.50% PG 64-22 petroleum asphalt, using the same procedure and conditions as those of Example 1, except that only 30 seconds of mixing was required to achieve coating of the aggregate with the asphalt. The properties of the product were then determined with the following results:

| | |
|---|---|
| Bulk Specific Gravity | 2.2878 |
| Marshall Stability | 1636 pounds |
| Marshall Flow | 0.163 inch |

Further observations regarding Examples 1 through 5: The mixed heat-treated granulated plastic (MHTGP) is easily incorporated in the warm mix asphalt as a portion of the mineral aggregate, and the product has properties indicating its usefulness for pavements. The inclusion of the MHTGP requires only a slight increase in the amount of petroleum asphalt to optimize these mixtures.

Examples Illustrating the Invention

Hot Mix Asphalt Paving Compositions Prepared with Dense Graded Aggregate and 0.4-0.5% ½-Inch MHTGP Example 6

A mixture was prepared by combining the following components at up to 204° C. (400° F.) in the proportions indicated: 92.06% ½-inch dense graded aggregate, 0.44% ½-inch MHTGP, 2.50% TDRS, 5.00% PG 64-22 petroleum asphalt. The combination was mixed by hand in a bowl per AASHTO Test Method T-245-94 for 45 seconds at 204°7C. (400° F.). The properties of the product were then determined with the following results:

| | |
|---|---|
| Bulk Specific Gravity | 2.2218 |
| Marshall Stability | 1208 pounds |
| Marshall Flow | 0.116 inch |
| Tensile Strength, Dry | 2160 pounds |
| Tensile Strength, Water Soaked | 2179 pounds |
| Tensile Strength Retained | 100.9% |

Example 7

A mixture was prepared by combining the following components at up to 204° C. (400° F.) in the proportions indicated: 91.26% 12-inch dense graded aggregate, 0.48% ½-inch MHTGP, 2.76% TDRS, 5.50% PG 64-22 petroleum asphalt. The combination was mixed, using the same procedure and conditions as those of Example 6. The properties of the product were then determined with the following results:

| | |
|---|---|
| Bulk Specific Gravity | 2.2782 |
| Marshall Stability | 1794 pounds |
| Marshall Flow | 0.137 inch |
| Tensile Strength, Dry | 2201 pounds |
| Tensile Strength, Water Soaked | 2220 pounds |
| Tensile Strength Retained | 100.8% |

Example 8

A mixture was prepared by combining the following components at up to 204° C. (400° F.) in the proportions indicated: 90.48% ½-inch dense graded aggregate, 0.52% ½-inch MHTGP, 3.00% TDRS, 6.00% PG 64-22 petroleum asphalt. The combination was mixed, using the same procedure and conditions as those of Example 6. The properties of the product were then determined with the following results:

| | |
|---|---|
| Bulk Specific Gravity | 2.2811 |
| Marshall Stability | 1794 pounds |
| Marshall Flow | 0.137 inch |
| Tensile Strength, Dry | 2316 pounds |
| Tensile Strength, Water Soaked | 2327 pounds |
| Tensile Strength Retained | 100.5% |

Example 9

A mixture was prepared by combining the following components at up to 204° C. (400° F.) in the proportions indicated: 89.68% ½-inch dense graded aggregate, 0.57% ½-inch MHTGP, 3.25% TDRS, 6.50% PG 64-22 petroleum asphalt. The combination was mixed, using the same procedure and conditions as those of Example 6. The properties of the product were then determined with the following results:

| | |
|---|---|
| Bulk Specific Gravity | 2.3022 |
| Marshall Stability | 2291 pounds |
| Marshall Flow | 0.128 inch |
| Tensile Strength, Dry | 2204 pounds |
| Tensile Strength, Water Soaked | 2213 pounds |
| Tensile Strength Retained | 100.4% |

Examples Illustrating the Invention

Hot Mix Asphalt Paving Compositions Prepared with Dense Graded Aggregate and 0.8-1.2% ½-Inch MHTGP Example 10

A mixture was prepared by combining the following components at up to 204° C. (400° F.) in the proportions indicated: 91.63% ½-inch dense graded aggregate, 0.87% MHTGP, 2.50% TDRS, 5.00% PG 64-22 petroleum asphalt. The combination was mixed by hand in a bowl per AASHTO Test Method T-245-94 for 45 seconds at 204°7C. (400° F.). The properties of the product were then determined with the following results:

| | |
|---|---|
| Bulk Specific Gravity | 2.2112 |
| Marshall Stability | 1471 pounds |
| Marshall Flow | 0.166 inch |
| Tensile Strength, Dry | 2152 pounds |
| Tensile Strength, Water Soaked | 2190 pounds |
| Tensile Strength Retained | 101.8% |

Example 11

A mixture was prepared by combining the following components at 204° C. (400° F.) in the proportions indicated: 90.79% ½-inch dense graded aggregate, 0.95% ½-inch MHTGP, 2.76% TDRS, 5.50% PG 64-22 petroleum asphalt. The combination was mixed, using the same procedure and conditions as those of Example 10. The properties of the product were then determined with the following results:

| | |
|---|---|
| Bulk Specific Gravity | 2.2443 |
| Marshall Stability | 1894 pounds |
| Marshall Flow | 0.141 inch |
| Tensile Strength, Dry | 2219 pounds |
| Tensile Strength, Water Soaked | 2290 pounds |
| Tensile Strength Retained | 103.2% |

Example 12

A mixture was prepared by combining the following components at 204° C. (400° F.) in the proportions indicated: 89.96% ½-inch dense graded aggregate, 1.04% MHTGP, 3.00% TDRS, 6.00% PG 64-22 petroleum asphalt. The combination was mixed, using the same procedure and conditions as those of Example 10. The properties of the product were then determined with the following results:

| | |
|---|---|
| Bulk Specific Gravity | 2.2585 |
| Marshall Stability | 1936 pounds |
| Marshall Flow | 0.156 inch |
| Tensile Strength, Dry | 2231 pounds |
| Tensile Strength, Water Soaked | 2290 pounds |
| Tensile Strength Retained | 102.6% |

Example 13

A mixture was prepared by combining the following components at 204° C. (400° F.) in the proportions indicated: 89.11% ½-inch dense graded aggregate, 1.14% ½-inch MHTGP, 3.25% TDRS, 6.50% PG 64-22 petroleum asphalt. The combination was mixed, using the same procedure and conditions as those of Example 10. The properties of the product were then determined with the following results:

| | |
|---|---|
| Bulk Specific Gravity | 2.2863 |
| Marshall Stability | 2237 pounds |
| Marshall Flow | 0.164 inch |
| Tensile Strength, Dry | 2246 pounds |
| Tensile Strength, Water Soaked | 2280 pounds |
| Tensile Strength Retained | 101.5% |

Example 14

A mixture was prepared by combining the following components at 204° C. (400° F.) in the proportions indicated: 89.96% ½-inch dense graded aggregate, 3.00% 80-mesh crushed limestone, 1.04% ½-inch MHTGP, 6.00% PG 64-22 petroleum asphalt. The combination was mixed, using the same procedure and conditions as those of Example 10. The properties of the product were then determined with the following results:

| | |
|---|---|
| Bulk Specific Gravity | 2.2645 |
| Marshall Stability | 1313 pounds |
| Marshall Flow | 0.148 inch |
| Tensile Strength, Dry | 2171 pounds |
| Tensile Strength, Water Soaked | 2101 pounds |
| Tensile Strength Retained | 96.8% |

Example 15

A mixture was prepared by combining the following components at 204° C. (400° F.) in the proportions indicated: 89.11% ½-inch dense graded aggregate, 3.25% 80-mesh crushed limestone, 1.14% ½-inch MHTGP, 6.50% PG 64-22 petroleum asphalt. The combination was mixed, using the same procedure and conditions as those of Example 10. The properties of the product were then determined with the following results:

| | |
|---|---|
| Bulk Specific Gravity | 2.2837 |
| Marshall Stability | 1904 pounds |
| Marshall Flow | 0.143 inch |
| Tensile Strength, Dry | 2260 pounds |
| Tensile Strength, Water Soaked | 2160 pounds |
| Tensile Strength Retained | 95.6% |

Further observations regarding Examples 6 through 15: The results were satisfactory in all cases, including the retained strengths (determined by the Lottman protocol) which were above the 80% level recommended by the industry. The fact that Examples 14 and 15 were performed without the inclusion of thermally desorbed refinery solids (TDRS) and with minus-80 mesh crushed limestone, and yet achieved a high value for the retained strength, indicated that the high retained strength is most likely due to good adhesion by the asphalt binder to the mineral aggregate.

Examples Illustrating the Invention

Hot Mix Asphalt Paving Compositions Prepared with Dense Graded Aggregate and 5.0±0.25% ½-Inch MHTGP Example 16

A mixture was prepared by combining the following components at up to 204° C. (400° F.) in the proportions indicated:

86.96% ½-inch dense graded aggregate, 4.78% ½-inch MHTGP, 2.76% TDRS, 5.50% PG 64-22 petroleum asphalt. The combination was mixed, using the same procedure and conditions as those of preceding examples. The properties of the product were then determined with the following results:

| Bulk Specific Gravity | 2.1092 |
|---|---|
| Marshall Stability | 2122 pounds |
| Marshall Flow | 0.174 inch |
| Tensile Strength, Dry | 2240 pounds |
| Tensile Strength, Water Soaked | 2213 pounds |
| Tensile Strength Retained | 98.8% |

Example 17

A mixture was prepared by combining the following components at up to 204° C. (400° F.) in the proportions indicated: 85.81% ½-inch dense graded aggregate, 5.22% ½-inch MHTGP, 3.00% TDRS, 6.00% PG 64-22 petroleum asphalt. The combination was mixed, using the same procedure and conditions as those of Example 16. The properties of the product were then determined with the following results:

| Bulk Specific Gravity | 2.1203 |
|---|---|
| Marshall Stability | 3394 pounds |
| Marshall Flow | 0.209 inch |
| Tensile Strength, Dry | 2383 pounds |
| Tensile Strength, Water Soaked | 2367 pounds |
| Tensile Strength Retained | 99.3% |

Example 18

A mixture was prepared by combining the following components at up to 204° C. (400° F.) in the proportions indicated: 84.60% ½-inch dense graded aggregate, 5.65% ½-inch MHTGP, 3.25% TDRS, 6.50% PG 64-22 petroleum asphalt. The combination was mixed, using the same procedure and conditions as those of Example 16. The properties of the product were then determined with the following results:

| Bulk Specific Gravity | 2.0971 |
|---|---|
| Marshall Stability | 2652 pounds |
| Marshall Flow | 0.199 inch |
| Tensile Strength, Dry | 2292 pounds |
| Tensile Strength, Water Soaked | 2282 pounds |
| Tensile Strength Retained | 9.6% |

Observation regarding Examples 16 through 18: At the increased level of minus-½-inch MHTGP in these examples relative to the preceding examples, a significant increase in Marshall stability was achieved.

Comparative Example

Hot Mix Asphalt Paving Compositions Prepared with Dense Graded Aggregate and without MHTGP Example 19

A mixture was prepared by combining the following components at up to 204° C. (400° F.) in the proportions indicated: 90.25% ½-inch dense graded aggregate, 3.25% TDRS, 6.50% PG 64-22 petroleum asphalt. The combination was mixed, using the same procedure and conditions as those of Example 16. The properties of the product were then determined with the following results:

| Bulk Specific Gravity | 2.3003 |
|---|---|
| Marshall Stability | 1648 pounds |
| Marshall Flow | 0.17 inch |
| Tensile Strength, Dry | 2171 pounds |
| Tensile Strength, Water Soaked | 2159 pounds |
| Tensile Strength Retained | 99.4% |

Observation regarding Example 19: This example demonstrates that the inclusion of MHTGP in the preceding invention examples improves the Marshall stability by about 60%, with no significant effect on the amount of flow. The inclusion of MHTGP also results in asphalt-aggregate compositions of lower bulk specific gravities.

Examples Illustrating the Invention

Hot Mix Asphalt Paving Compositions Prepared with Dense Graded Aggregate and 10.0±0.5% 4.75-mm MHTGP Example 20

A mixture was prepared by combining the following components at up to 204° C. (400° F.) in the proportions indicated: 79.92% ½-inch dense graded aggregate, 10.34% 4.75-mm MHTGP, 2.98% TDRS, 6.76% PG 64-22 petroleum asphalt. The combination was mixed, using the same procedure and conditions as those of Example 16. The properties of the product were then determined with the following results:

| Bulk Specific Gravity | 1.8717 |
|---|---|
| Marshall Stability | 4345 pounds |
| Marshall Flow | 0.155 inch |
| Tensile Strength, Dry | 2255 pounds |
| Tensile Strength, Water Soaked | 2380 pounds |
| Tensile Strength Retained | 101.1% |

Example 21

A mixture was prepared by combining the following components at up to 204° C. (400° F.) in the proportions indicated: 80.27% ½-inch dense graded aggregate, 10.34% 4.75-mm MHTGP, 3.13% TDRS, 6.26% PG 64-22 petroleum asphalt. The combination was mixed, using the same procedure and conditions as those of Example 16. The properties of the product were then determined with the following results:

| Bulk Specific Gravity | 1.7472 |
|---|---|
| Marshall Stability | 4018 pounds |
| Marshall Flow | 0.141 inch |
| Tensile Strength, Dry | 2243 pounds |
| Tensile Strength, Water Soaked | 2232 pounds |
| Tensile Strength Retained | 100.5% |

Examples Illustrating the Invention

Hot Mix Asphalt Paving Compositions Prepared with Dense Graded Aggregate and 6.0-7.5% 4.75-mm MHTGP Example 22

A mixture was prepared by combining the following components at up to 204° C. (400° F.) in the proportions indicated: 82.00% ½-inch dense graded aggregate, 7.5% 4.75-mm MHTGP, 3.50% TDRS, 7.00% PG 64-22 petroleum asphalt. The combination was mixed, using the same procedure and conditions as those of Example 16. The properties of the product were then determined with the following results:

| | |
|---|---|
| Bulk Specific Gravity | 1.8978 |
| Marshall Stability | 3573 pounds |
| Marshall Flow | 0.141 inch |
| Tensile Strength, Dry | 2210 pounds |
| Tensile Strength, Water Soaked | 2202 pounds |
| Tensile Strength Retained | 96.6% |

Example 23

A mixture was prepared by combining the following components at up to 204° C. (400° F.) in the proportions indicated: 83.30% ½-inch dense graded aggregate, 6.30% 4.75-mm MHTGP, 3.30% TDRS, 6.60% PG 64-22 petroleum asphalt. The combination was mixed, using the same procedure and conditions as those of Example 16. The properties of the product were then determined with the following results:

| | |
|---|---|
| Bulk Specific Gravity | 2.0894 |
| Marshall Stability | 3100 pounds |
| Marshall Flow | 0.17 inch |
| Tensile Strength, Dry | 2160 pounds |
| Tensile Strength, Water Soaked | 1950 pounds |
| Tensile Strength Retained | 90.3% |

Examples Illustrating the Invention

Hot Mix Asphalt Paving Compositions Prepared with Stone Mastic Asphalt Aggregate and 6.0-7.5% 4.75-mm MHTGP Example 24

A mixture was prepared by combining the following components at up to 204° C. (400° F.) in the proportions indicated: 89.77% ½-inch dense graded aggregate, 4.73% 4.75-mm MHTGP, and 5.50% PGTR 70-22 asphalt binder. The combination was mixed, using the same procedure and conditions as those of Example 16, adding the MHTGP after the aggregate was mixed and coated with the binder. The properties of the product were then determined with the following results:

| | |
|---|---|
| Bulk Specific Gravity | 2.1382 |
| Marshall Stability | 1898 pounds |
| Marshall Flow | 0.189 inch |

Example 25

A mixture was prepared by combining the following components at up to 204° C. (400° F.) in the proportions indicated: 89.30% ½-inch dense graded aggregate, 4.70% 4.75-mm MHTGP, and 6.00% PGTR 70-22 asphalt binder. The combination was mixed, using the same procedure and conditions as those of Example 24. The properties of the product were then determined with the following results:

| | |
|---|---|
| Bulk Specific Gravity | 2.1278 |
| Marshall Stability | 2137 pounds |
| Marshall Flow | 0.178 inch |
| Tensile Strength, Dry | 2360 pounds |
| Tensile Strength, Water Soaked | 2240 pounds |
| Tensile Strength Retained | 94.9% |

Example 26

A mixture was prepared by combining the following components at up to 204° C. (400° F.) in the proportions indicated: 88.82% ½-inch dense graded aggregate, 4.68% 4.75-mm MHTGP, and 6.50% PGTR 70-22 asphalt binder. The combination was mixed, using the same procedure and conditions as those of Example 24. The properties of the product were then determined with the following results:

| | |
|---|---|
| Bulk Specific Gravity | 2.1282 |
| Marshall Stability | 2007 pounds |
| Marshall Flow | 0.214 inch |

Comparative Example

Hot Mix Asphalt Paving Compositions Made with Stone Mastic Asphalt Aggregate and without MHTGP Example 27

A mixture was prepared by combining the following components at up to 204° C. (400° F.) in the proportions indicated: 94.00% ½-inch dense graded aggregate and 6.00% PGTR 70-22 asphalt binder. The combination was mixed, using the same procedure and conditions as those of Example 24. The properties of the product were then determined with the following results:

| | |
|---|---|
| Bulk Specific Gravity | 2.2477 |
| Marshall Stability | 1601 pounds |
| Marshall Flow | 0.149 inch |
| Tensile Strength, Dry | 2249 pounds |
| Tensile Strength, Water Soaked | 636 pounds |
| Tensile Strength Retained | 28.3% |

Examples Illustrating the Invention

Hot Mix Asphalt Paving Compositions Made with Open Graded Aggregate and Asphalt Binder and 6.0-7.5% No. 4 Sieve MHTGP

Example 28

A mixture was prepared by combining the following components at up to 204° C. (400° F.) in the proportions indicated: 93.3% ½-inch open graded aggregate, 2.3% 4.75-mm MHTGP, and 4.5% PGTR 76-16 asphalt binder. The combination was mixed, using the same procedure and conditions as those of Example 24, adding the MHTGP after the aggregate was mixed and coated with the binder. The properties of the product were then determined with the following results:

| | |
|---|---|
| Bulk Specific Gravity | 2.0621 |
| Marshall Stability | 1767 pounds |
| Marshall Flow | 0.198 inch |
| Tensile Strength, Dry | 607 |
| Tensile Strength, Water Soaked | 188 |
| Tensile Strength Retained | 30.9% |

Example 29

A mixture was prepared by combining the following components at up to 204° C. (400° F.) in the proportions indicated: 92.5% ½-inch open graded aggregate, 2.5% 4.75-mm MHTGP, and 4.0% PGTR 76-16 asphalt binder. The combination was mixed, using the same procedure and conditions as those of Example 28. The properties of the product were then determined with the following results:

| | |
|---|---|
| Bulk Specific Gravity | 2.0648 |
| Marshall Stability | 1927 pounds |
| Marshall Flow | 0.204 inch |
| Tensile Strength, Dry | 721 |
| Tensile Strength, Water Soaked | 291 |
| Tensile Strength Retained | 40.4% |

Example 30

A mixture was prepared by combining the following components at up to 204° C. (400° F.) in the proportions indicated: 91.7% ½-inch open graded aggregate, 2.8% 4.75-mm MHTGP, and 5.5% PGTR 76-16 asphalt binder. The combination was mixed, using the same procedure and conditions as those of Example 28. The properties of the product were then determined with the following results:

| | |
|---|---|
| Bulk Specific Gravity | 2.0645 |
| Marshall Stability | 1831 pounds |
| Marshall Flow | 0.217 inch |
| Tensile Strength, Dry | 669 |
| Tensile Strength, Water Soaked | 248 |
| Tensile Strength Retained | 37.2% |

Observations regarding Examples 28 through 30: The inclusion of MHTGP in these examples contributed to increased Marshall stabilities with acceptable Marshall flows, and the asphalt binder did not show a tendency to drain off the aggregate or to separate and collect near the bottom of the storage vessel. These mixes would however require lime treatment or the addition of TDRS to achieve acceptable retained strengths.

Examples Illustrating the Invention

Adobe Compositions Made with Asphalt Binder and No. 4 Sieve MHTGP

For the following examples, native adobe soil was dried and placed in a ball mill where it was crushed to minus-30 mesh (0.600 mm). The sieve gradation of the crushed soil was as follows:

| Sieve | Percent Passing |
|---|---|
| No. 16 (0.991 mm) | 99.7 |
| No. 30 (0.600 mm) | 98.4 |
| No. 80 (0.180 mm) | 64.7 |
| No. 200 (0.075 mm) | 10.6 |

Example 31

A mixture was prepared by heating 935 parts by weight of the crushed native adobe soil to 204° C. (400° F.), adding 82.5 parts by weight of PG 64-16 petroleum asphalt heated to the same temperature, and mixing the soil and asphalt until the hot mixture was uniform. To the mixture was then added 82.5 parts by weight of 4.75-mm MHTGP at ambient temperature, and mixed until uniform. On a weight percent basis, the mixture consisted of 85.0% adobe soil, 7.5% asphalt binder, and 7.5% MHTGP. The properties of the resulting mixture were determined with the following results:

| | |
|---|---|
| Bulk Specific Gravity | 1.6970 |
| Unconfined Marshall Stability at 25° C. | 6391 pounds |
| Compressive Strength | 508.5 psi |

The sample was then reheated and compacted again, then cooled, extracted from the mold, and immersed in a bucket of water at ambient temperature overnight. This caused the sample to increase in weight by 6.25% from water absorption. When re-tested in this condition, the sample displayed an unconfined stability of 5193 pounds, equal to an increase of 81.25% of the original unconfined stability.

Example 32

A mixture was prepared by heating 721.6 parts by weight of the crushed native adobe soil to 204° C. (400° F.), adding 88 parts by weight of PG 64-16 petroleum asphalt heated to the same temperature, mixing the soil and asphalt until the hot mixture was uniform, then adding 70.4 parts by weight of 4.75-mm MHTGP at ambient temperature, and mixing again until uniform. On a weight percent basis, the mixture consisted of 82% adobe soil, 10% asphalt binder, and 8% MHTGP. The properties of the resulting mixture were determined with the following results:

| | |
|---|---|
| Bulk Specific Gravity | 1.8335 |
| Unconfined Marshall Stability at 25° C. | 6985 pounds |
| Compressive Strength | 555.8 psi |

The sample was then reheated and compacted again, then cooled, extracted from the mold, and immersed in a bucket of water at ambient temperature overnight. This caused the sample to increase in weight by 2.68% from water absorption. When re-tested in this condition, the sample displayed an unconfined stability of 8293 pounds, equal to an increase of 18.73% of the original unconfined stability.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein or any prior art in general and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. An asphalt-aggregate composition comprising:
    an asphalt binder;
    solid granulated aggregate; and
    a granulated plastic additive produced by a process comprising (a) contacting said pieces of shredded scrap plastic with an aqueous liquid at a temperature exceeding 75° C. to kill any microorganisms present on said pieces and to remove any contaminants from said pieces, (b) heating said pieces of shredded scrap plastic thus decontaminated to a temperature exceeding 100° C. for a sufficient period of time to cause size reduction of said pieces of shredded scrap plastic and to harden said pieces of shredded scrap plastic to grindable form without generating gaseous decomposition products, (c) cooling said size-reduced and hardened pieces to a temperature below 50° C., and (d) comminuting said cooled pieces to sizes small enough to pass through a screen with 12.5 mm openings.

2. The asphalt-aggregate composition of claim 1 wherein step (b) of said process to produce said granulated plastic additive comprises heating said pieces of shredded scrap plastic to a temperature of from about 110° C. to about 250° C. for a period of time ranging from about one minute to about 30 minutes.

3. The asphalt-aggregate composition of claim 1 wherein step (b) of said process to produce said granulated plastic additive comprises heating said pieces of shredded scrap plastic to a temperature of from about 135° C. to about 232° C. for a period of time ranging from about one minute to about 10 minutes.

4. The asphalt-aggregate composition of claim 1 wherein step (d) of said process to produce said granulated plastic additive comprises comminuting said cooled pieces to sizes small enough to pass through a screen with 5 mm openings.

5. The asphalt-aggregate composition of claim 1 wherein step (a) is performed at a temperature of from about 90° C. to about 100° C.

6. The asphalt-aggregate composition of claim 1 wherein said granulated plastic additive constitutes from about 0.2% to about 20% by weight of said asphalt-aggregate composition.

7. The asphalt-aggregate composition of claim 1 wherein said granulated plastic additive constitutes from about 0.3% to about 10% by weight of said asphalt-aggregate composition.

8. The asphalt-aggregate composition of claim 1 wherein said aggregate constitutes from about 70% to about 97% by weight, and said granulated plastic additive constitutes from about 0.2% to about 20% by weight, of said asphalt-aggregate composition.

9. The asphalt-aggregate composition of claim 1 wherein said aggregate constitutes from about 75% to about 95% by weight, and said granulated plastic additive constitutes from about 0.3% to about 10% by weight, of said asphalt-aggregate composition.

10. An asphalt-aggregate composition comprising:
    an asphalt binder;
    solid granulated aggregate;
    dehydrated waste solids from a crude oil refining operation, comminuted to particles whose longest dimension is a maximum of about 600 microns; and
    a granulated plastic additive produced by a process comprising (a) heating pieces of shredded scrap plastic to a temperature exceeding 100° C. for a sufficient period of time to cause size reduction of said pieces of shredded scrap plastic and to harden said pieces of shredded scrap plastic to grindable form without generating gaseous decomposition products, (b) cooling said size-reduced and hardened pieces to a temperature below 50° C., and (c) comminuting said cooled pieces to sizes small enough to pass through a screen with 12.5 mm openings.

11. The asphalt-aggregate composition of claim 10 wherein said dehydrated waste solids constitute from about 0.2% to about 10% by weight of said asphalt-aggregate composition.

12. The asphalt-aggregate composition of claim 10 wherein said dehydrated waste solids constitute from about 1% to about 5% by weight of said asphalt-aggregate composition.

13. The asphalt-aggregate composition of claim 10 wherein said solid granulated aggregate constitutes from about 75% to about 95% by weight, said dehydrated waste solids constitute from about 1% to about 5% by weight, and said granulated additive constitutes from about 0.4% to about 12% by weight, of said asphalt-aggregate composition.

14. The asphalt-aggregate composition of claims 1 or 10 wherein said solid granulated aggregate is a member selected from the group consisting of marble, limestone, basalt, dolomite, sandstone, granite, quartzite, and recycled pavement.

15. An adobe brick comprising:
    an asphalt binder;
    adobe soil; and
    a granulated plastic additive produced by a process comprising (a) heating pieces of shredded scrap plastic to a temperature exceeding 100° C. for a sufficient period of time to cause size reduction of said pieces of shredded scrap plastic and to harden said pieces of shredded scrap plastic to grindable form without generating gaseous decomposition products, (b) cooling said size-reduced and hardened pieces to a temperature below 50° C., and (c) comminuting said cooled pieces to sizes small enough to pass through a screen with 12.5 mm openings.

16. A process for incorporating scrap plastic in an asphalt-aggregate composition, said process comprising:

(a) heating pieces of said scrap plastic in shredded form to a temperature exceeding 100° C. for a sufficient period of time to cause size reduction of said pieces of shredded scrap plastic and to harden said pieces of shredded scrap plastic to grindable form without generating gaseous decomposition products, (b) cooling said size-reduced and hardened pieces to a temperature below 50° C., (c) comminuting said cooled pieces to sizes small enough to pass through a screen with 12.5 mm openings, and (d) combining said comminuted pieces with (i) an asphalt binder, (ii) dehydrated waste solids from a crude oil refining operation, and (iii) solid granulated aggregate to form said asphalt-aggregate composition.

17. The process of claim 16 wherein step (d) comprises heating said aggregate to an elevated temperature ranging from about 150° C. to about 210° C., blending said comminuted pieces with said solid granulated aggregate while said solid granulated aggregate is at said elevated temperature to form a plastic-aggregate blend, and adding said plastic-aggregate blend to said asphalt binder.

18. The process of claim 16 wherein step (a) comprises heating said pieces of shredded scrap plastic to a temperature of from about 110° C. to about 250° C. for a period of time ranging from about one minute to about 30 minutes.

19. The process of claim 16 wherein step (a) comprises heating said pieces of shredded scrap plastic to a temperature of from about 135° C. to about 232° C. for a period of time ranging from about one minute to about 10 minutes.

20. The process of claim 16 wherein step (c) comprises comminuting said cooled pieces to sizes small enough to pass through a screen with 5 mm openings.

21. The process of claim 16 wherein step (d) comprises combining said comminuted pieces with said asphalt binder and said solid granulated aggregate at a proportion of from about 0.2 to about 20 parts by weight of said comminuted pieces per 100 parts by weight of said comminuted pieces, said asphalt binder, and said solid granulated aggregate combined.

22. The process of claim 16 wherein step (d) comprises combining said comminuted pieces with said asphalt binder and said aggregate at a proportion of from about 0.3 to about 10 parts by weight of said comminuted pieces per 100 parts by weight of said comminuted pieces, said asphalt binder, and said aggregate combined.

23. The process of claim 16 wherein step (d) comprises using from about 70 to about 97 parts by weight of said solid granulated aggregate per 100 parts by weight of said comminuted pieces, said asphalt binder, and said solid granulated aggregate combined.

24. The process of claim 16 wherein said dehydrated waste solids constitute from about 0.2% to about 10% by weight of said asphalt-aggregate composition.

25. The process of claim 16 wherein step (a) comprises heating said pieces of shredded scrap plastic to a temperature of from about 135° C. to about 232° C. for a period of time ranging from about one minute to about 10 minutes, step (c) comprises comminuting said cooled pieces to sizes small enough to pass through a screen with 5 mm openings, step (d) comprises combining said comminuted pieces with said asphalt binder and said solid granulated aggregate at a proportion of from about 0.3 to about 10 parts by weight of said comminuted pieces and from about 70 to about 97 parts by weight of said solid granulated aggregate per 100 parts by weight of said comminuted pieces, said asphalt binder, and said solid granulated aggregate combined, and step (d) comprises heating said solid granulated aggregate to an elevated temperature ranging from about 150° C. to about 250° C., blending said comminuted pieces with said solid granulated aggregate while said solid granulated aggregate is at said elevated temperature to form a plastic-aggregate blend, and adding said plastic-aggregate blend to said asphalt binder.

26. The process of claim 16 wherein said solid granulated aggregate is a member selected from the group consisting of marble, limestone, basalt, dolomite, sandstone, granite, quartzite, and recycled pavement.

27. A process for incorporating scrap plastic in an adobe brick, said process comprising:
(a) heating pieces of said scrap plastic in shredded form to a temperature exceeding 100° C. for a sufficient period of time to cause size reduction of said pieces of shredded scrap plastic and to harden said pieces of shredded scrap plastic to grindable form without generating gaseous decomposition products, (b) cooling said size-reduced and hardened pieces to a temperature below 50° C., (c) comminuting said cooled pieces to sizes small enough to pass through a screen with 12.5 mm openings, and (d) combining said comminuted pieces with (i) an asphalt binder and (ii) adobe soil to form said adobe brick.

* * * * *